United States Patent [19]
Lee et al.

[11] Patent Number: 5,901,216
[45] Date of Patent: May 4, 1999

[54] MEMBRANE SWITCH FOR A TELEPHONE HANDSET

[75] Inventors: Peter Lee, Huntington Beach; George F. Cheung, La Mirada, both of Calif.

[73] Assignee: Ameriphone, Inc, Garden Cove, Calif.

[21] Appl. No.: 08/880,259

[22] Filed: Jun. 23, 1997

[51] Int. Cl.⁶ .................................................. H04M 1/00
[52] U.S. Cl. ........................................... 379/268; 379/428
[58] Field of Search .................................... 379/368–370, 379/433, 428, 447; 200/309, 531; 434/317, 327, 339

[56] References Cited

U.S. PATENT DOCUMENTS 2,853,585  9/1958  Danziger et al. ..................... 200/309
4,866,764  9/1989  Barker, III .
4,926,459  5/1990  Advani et al. .
5,356,296  10/1994  Pierce et al. ........................... 434/317

*Primary Examiner*—Jack Chiang
*Attorney, Agent, or Firm*—Blakely Sokoloff Taylor & Zafman

[57] ABSTRACT

A photo-assisted secondary keypad for a telephone. The secondary keypad includes a plurality of openings that expose a number of membrane switch keypads. Depression of a keypad dials a telephone number stored in a memory of the phone unit. Each opening has at least one slot which receives and captures a paper insert. The insert may be a photograph or a graphic image of an individual, police car, etc. The phone numbers associated with each keypad correspond to the images of the inserts. The inserts can be easily installed into the openings by sliding a corner of an insert into the slot.

15 Claims, 2 Drawing Sheets

MEMBRANE SWITCH FOR A TELEPHONE HANDSET

BACKGROUND OF THE INVENTION

1. Field of the Invention

The present invention relates to a telephone which has photo-assisted memory buttons.

2. Description of Related Art

There have been developed telephones which can be operated by small children or people with a cognitive disorder. These telephones typically include a secondary keypad which contains a number of photo-assisted memory buttons. For example, U.S. Pat. No. 4,866,764 issued to Barker discloses a telephone which has a secondary keypad that has a plurality of photo-assisted memory buttons. Each button has a slot which allows the user to install an insert which contains a photograph, or a graphic image such as a fire truck or a police car. The police or fire department can be automatically dialed by depressing the memory button which has an associated insert. The Barker handset also contains fiber optic cable and a light source which illuminates each button.

Each photo-assisted memory button of the Barker secondary keypad includes a slot located on a side of the button. The photo-inserts are installed into the buttons by pushing the inserts into the slots. Installing and replacing an insert requires a certain level of motor skills that is typically lacking in a small child or a person with a cognitive disorder. For example, removal of the insert would require a tweezers or other similar tool.

Additionally, the insert must be cut to fit within the slot. To insure installation the insert is typically cut smaller than the slot. The undersized insert exposes the underlying button which creates an undesirable appearance. It would be desirable to provide a photo-assisted keypad which allows a user to easily install an insert and has a desirable appearance.

SUMMARY OF THE INVENTION

The present invention is a photo-assisted secondary keypad for a telephone. The secondary keypad includes a housing which has an opening that can receive an insert. The insert may have a photo or graphic image. The insert is captured by a slot within the opening of the housing. Located beneath the insert is a keypad that can be depressed to automatically dial a telephone number.

DETAILED DESCRIPTION OF THE INVENTION

The present invention is a photo-assisted secondary keypad for a telephone. The secondary keypad includes a plurality of openings that expose a number of membrane switch keypads. Depression of a keypad dials a telephone number stored in a memory of the phone unit. Each opening has at least one slot which receives and captures a paper insert. The insert may be a photograph or a graphic image of an individual, police car, etc. The phone numbers associated with each keypad correspond to the images of the inserts. The inserts can be easily installed into the openings by sliding a corner of an insert into the slot.

Figure 1:
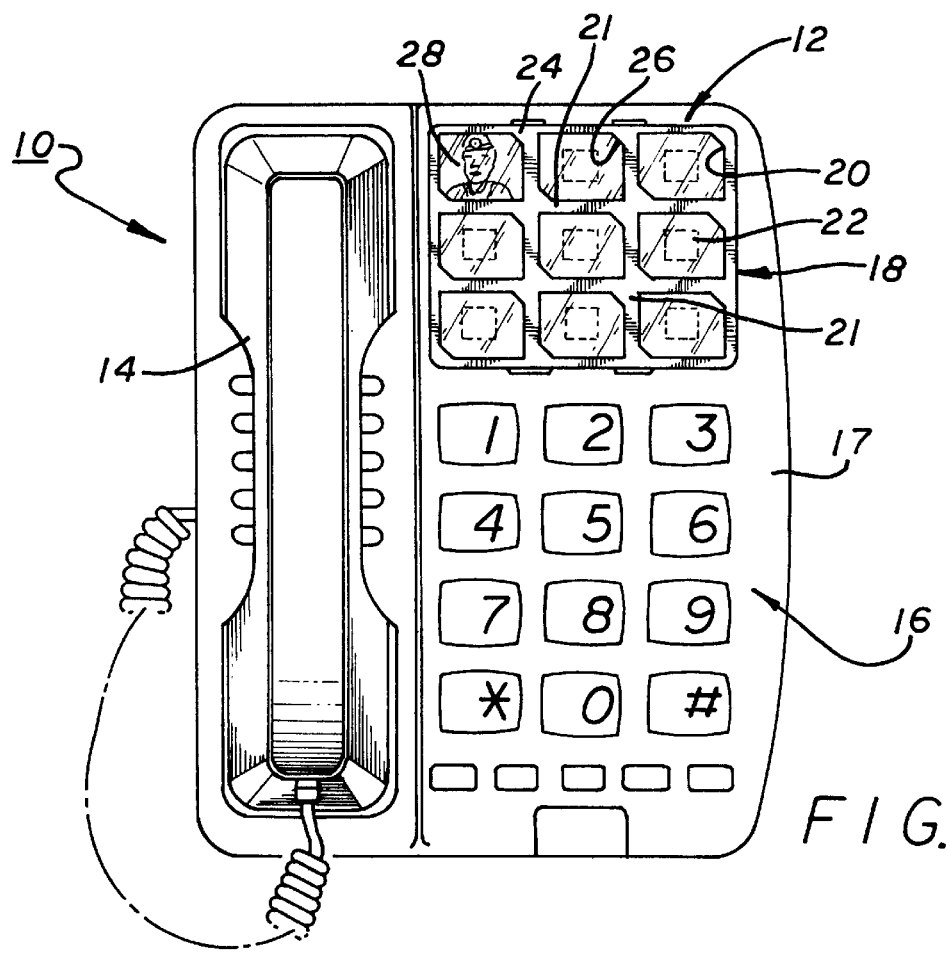
FIG. 1 is a top view of a telephone of the present invention.

FIG. 1 shows a telephone 10 which has a secondary keypad 12 of the present invention. The telephone 10 also has a handset 14 and an alphanumeric keypad 16 which allows a user to dial a phone number by depressing the various buttons of the keypad 16. The keypads 12 and 16 are located on the top surface of a telephone housing 17.

The secondary keypad 12 includes a secondary keypad housing 18 which has a plurality of openings 20. The openings 20 are separated by walls 21 of the housing 18. Each opening 20 has a corresponding keypad 22. The keypads 22 are connected to electrical circuitry of the phone such that an associated telephone number stored in a memory device of the phone 10 will be automatically dialed when the pad 22 is depressed by an end user.

Each opening 20 has a pair of corner lips 24 which create a slot 26 between the keypad housing 18 and the keypad 22. The slots 26 receive and capture the corners of an insert 28. The insert 28 is typically a photograph or graphic image that corresponds to a person or entity that is associated with the phone number of the keypad 22. For example, the picture of a doctor may be inserted into one of the openings. The phone can be programmed so that depressing the keypad associated with the doctor dials the doctors telephone number. The secondary keypad is designed for use by small children or people with a cognitive disorder. Consequently, the openings 20 and inserts 28 are larger than conventional memory inserts. By way of example, the openings 20 are typically 1 inch by 1 inch.

Figure 2:
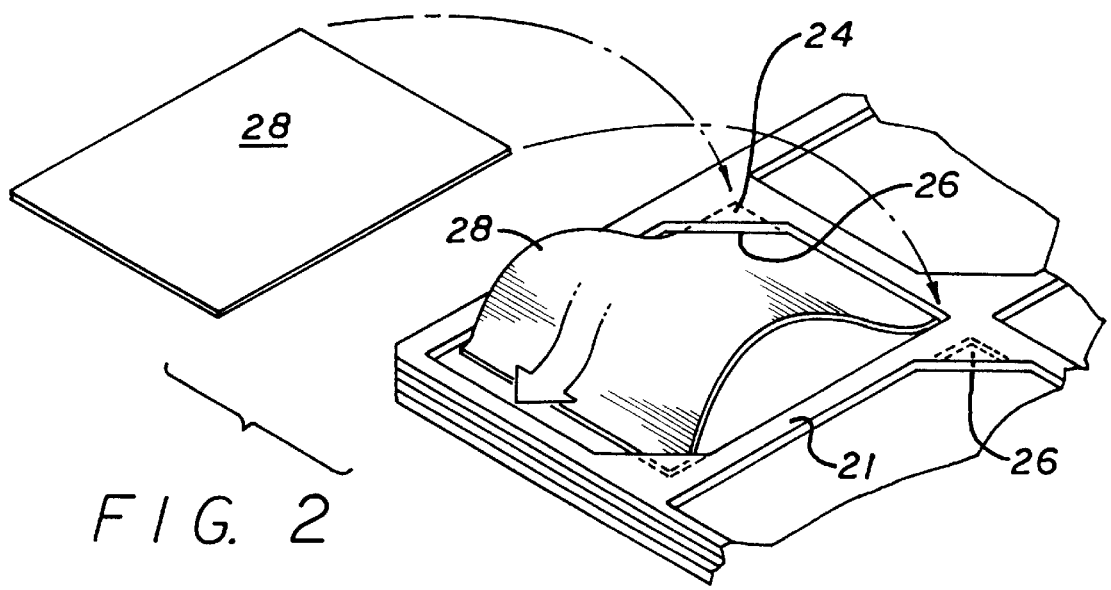
FIG. 2 is a perspective view showing an insert being installed into a secondary keypad of the telephone.

As shown in FIG. 2, an insert 28 can be installed into an opening 20 by sliding one corner of the insert 28 into one of the slots 26, bending the insert 28, and then sliding the other corner into the opposite slot 26. The inserts 28 can be installed with a relatively low amount of motor skills, thus allowing a small child, or someone with a cognitive disorder to install and replace the inserts 28.

Figure 3:
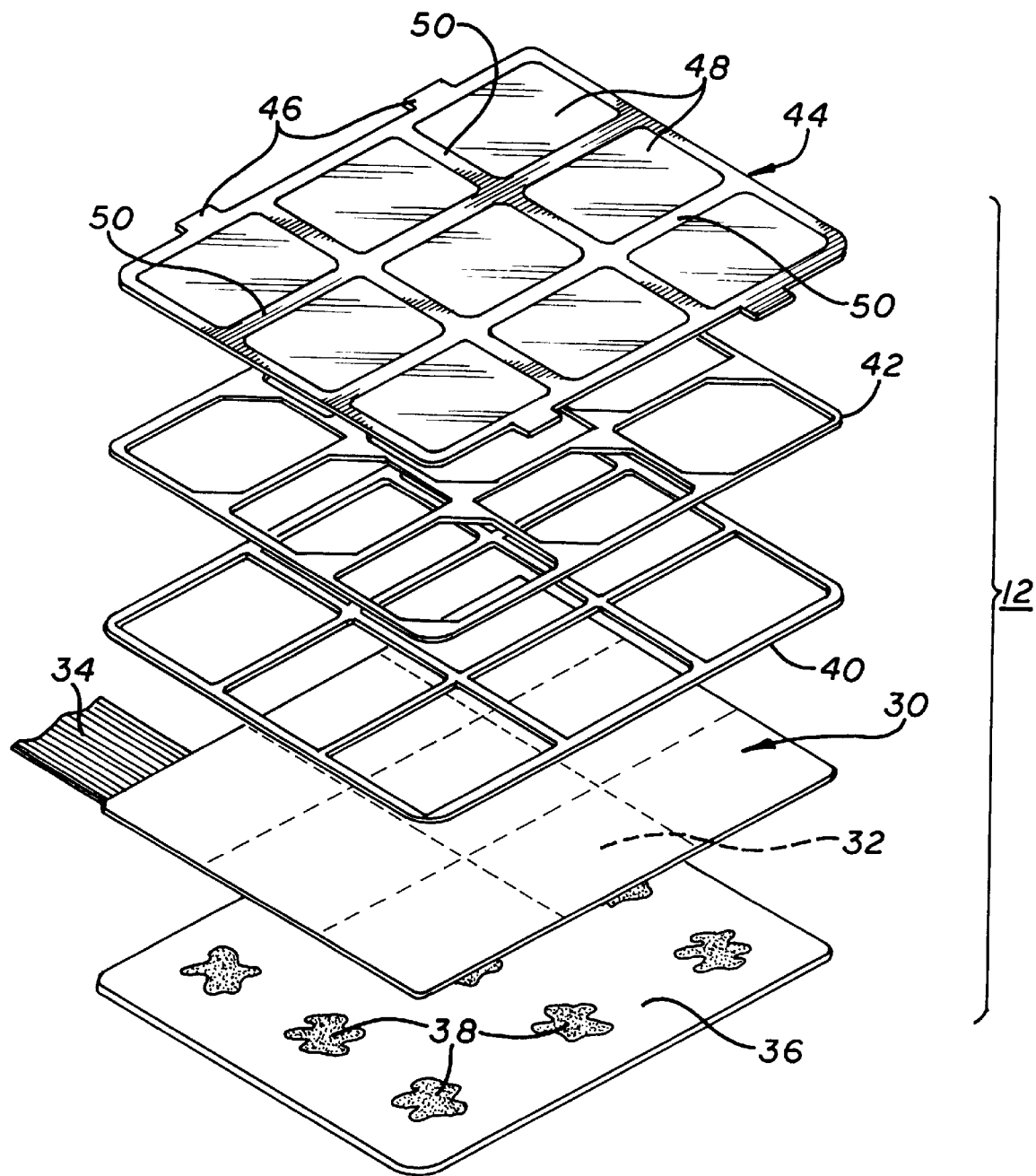
FIG. 3 is an exploded view of a secondary keypad.

FIG. 3 shows an embodiment of the secondary keypad 12. The keypads 22 can be constructed from a single membrane switch matrix 30 which contains a plurality of individual membrane contact switches 32. The membrane switches 32 are connected to an electrical cable 34 that can be coupled to the electrical circuits of the phone 10. A bottom member 36 may be attached to the matrix 30 by a self-adhesive 38.

The secondary keypad housing 18 may be constructed from a lower spacer 40 and an upper retainer 42. The two members 40 and 42 may be bonded together by an adhesive or other means. The retainer 42 contains the corner lips 24 for each opening 20.

The secondary keypad 12 may also have a cover 44 that encloses the inserts 28. The cover 44 can be secured to the telephone 10 by a plurality of tabs 46 that are inserted into corresponding slots of the telephone housing 17. The cover 44 protects the inserts from wear and damage.

The cover 44 has a plurality of transparent windows 48 that are separated by opaque areas 50. The transparent windows 48 are typically smaller than the openings 20. In this manner if the user cuts an insert 28 smaller than an opening 20 the opaque areas 50 will conceal the space between the housing 18 and the undersized insert, thereby providing an aesthetically pleasing design.

The present invention thus provides a photo-assisted secondary keypad that makes it easy to install an insert and has a desirable appearance.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, the inserts 28 can be captured by the cover 44 without having slots 26 in the keypad housing 18.

What is claimed is:

1. A telephone keypad that is adapted to contain a photo-assisted insert which has a pair of corners, comprising:
   a secondary keypad housing which has an opening and a pair of lips that extend across a pair of diametrically opposed corners of said opening, each lip is adjacent to a slot that can receive and capture the corners of the photo-assisted insert; and,
   a keypad that is located within said opening.

2. The keypad as recited in claim 1, further comprising a cover that encloses the insert.

3. The keypad as recited in claim 1, wherein said keypad is a membrane switch.

4. The keypad as recited in claim 1, wherein said opening has a pair of slots located at opposite corners of said opening.

5. The keypad as recited in claim 2, wherein said cover has a transparent window that is smaller than said opening.

6. A telephone keypad that is adapted to contain a plurality of photo-assisted inserts which has a pair of corners, comprising:
   a keypad which has a plurality of membrane switches;
   a secondary keypad housing which has a plurality of openings that expose said membrane switches, each opening having a pair of diametrically opposed corners of said opening, each lip is adjacent to a slot that can receive and capture a corner of one of the photo-assisted inserts; and,
   a cover that encloses said openings.

7. The keypad as recited in claim 6, wherein said cover has a plurality of transparent windows that are aligned with said openings.

8. The keypad as recited in claim 7, wherein each window is smaller than each opening.

9. A telephone that is adapted to contain a photo-assisted insert which has a pair of corners, comprising:
   an alphanumeric keypad; and
   a secondary keypad which has a secondary keypad which has an opening and a pair of lips that extend across a pair of diametrically opposed corners of said opening, each lip is adjacent to a slot that receives and captures a corner of the photo-assisted insert.

10. The telephone as recited in claim 9, further comprising a cover that encloses the photo-assisted insert.

11. The telephone as recited in claim 9, wherein said keypad is a membrane switch.

12. The telephone as recited in claim 9, wherein said opening has a pair of slots located at opposite corners of said opening.

13. The telephone as recited in claim 10, wherein said cover has a transparent window that is smaller than said opening.

14. A telephone keypad that is adapted to contain at least two photo-assisted inserts which has a pair of corners, comprising:
   a secondary keypad housing that contains at least two openings that can receive the photo-assisted inserts, each opening contains a pair of lips that extend across a pair of diametrically opposed corners of said opening, each lip is adjacent to a slot that can receive and capture the corners of the photo-assisted insert; and
   a cover that captures the photo-assisted inserts.

15. The keypad as recited in claim 14, wherein said cover has a transparent window that is smaller than said opening.

* * * * *